US012759375B2

(12) United States Patent
Kim et al.

(10) Patent No.: US 12,759,375 B2
(45) Date of Patent: Oct. 13, 2026

(54) THERMAL MANAGEMENT SYSTEM FOR VEHICLE

(71) Applicants: Hyundai Motor Company, Seoul (KR); Kia Corporation, Seoul (KR)

(72) Inventors: Jong Won Kim, Cheonan-Si (KR); Sang Shin Lee, Suwon-Si (KR)

(73) Assignees: 1. Hyundai Motor Company, Seoul (KR); 2. Kia Corporation, Seoul (KR)

( * ) Notice: Subject to any disclaimer, the term of this patent is extended or adjusted under 35 U.S.C. 154(b) by 127 days.

(21) Appl. No.: 18/796,775

(22) Filed: Aug. 7, 2024

(65) Prior Publication Data

US 2024/0391299 A1 Nov. 28, 2024

Related U.S. Application Data

(62) Division of application No. 17/842,604, filed on Jun. 16, 2022, now abandoned.

(30) Foreign Application Priority Data

Dec. 10, 2021 (KR) ........................ 10-2021-0176835

(51) Int. Cl.
*B60H 1/32* (2006.01)
*B60H 1/00* (2006.01)
(Continued)

(52) U.S. Cl.
CPC ....... *B60H 1/3228* (2019.05); *B60H 1/00392* (2013.01); *B60H 1/00485* (2013.01);
(Continued)

(58) Field of Classification Search
CPC ............ B60H 1/00392; B60H 1/00485; B60H 1/3228; F25B 41/20; F25B 41/31; F25B 2600/2513
See application file for complete search history.

(56) References Cited

U.S. PATENT DOCUMENTS 5,740,681 A 4/1998 Karl
5,816,055 A * 10/1998 Ohman .................. F25B 1/047 62/196.3

(Continued)

FOREIGN PATENT DOCUMENTS

JP 2002-120546 4/2002
JP 2012-233676 11/2012

(Continued)

*Primary Examiner* — Jonathan Bradford
(74) *Attorney, Agent, or Firm* — MORGAN, LEWIS & BOCKIUS LLP

(57) ABSTRACT

A thermal management system for a vehicle includes a base circuit in which a compressor, a condenser, an expansion valve, and an evaporator are provided in order and in which a refrigerant is circulated, a recirculation circuit branched from a discharge portion of the compressor in the base circuit and joined to an inlet portion of the compressor so that the refrigerant discharged from the compressor is recirculated to an inlet of the compressor, and an adjusting valve positioned at the discharge portion where the recirculation circuit is branched from the base circuit or positioned at the inlet portion where the recirculation circuit is joined to the base circuit, the adjusting valve configured to adjust a flow rate of the refrigerant that flows to the recirculation circuit.

3 Claims, 10 Drawing Sheets

(51) Int. Cl.
*F25B 41/20* (2021.01)
*F25B 41/31* (2021.01)

(52) U.S. Cl.
CPC .............. *F25B 41/20* (2021.01); *F25B 41/31* (2021.01); *F25B 2600/2513* (2013.01)

(56) References Cited

U.S. PATENT DOCUMENTS

| | | | |
|---|---|---|---|
| 10,131,203 | B2 | 11/2018 | Suzuki et al. |
| 2016/0280041 | A1 | 9/2016 | Suzuki et al. |

FOREIGN PATENT DOCUMENTS

| | | |
|---|---|---|
| JP | 6394505 | 9/2018 |
| JP | 2019-066133 | 4/2019 |
| KR | 10-1280381 | 7/2013 |
| KR | 10-1637755 | 7/2016 |
| KR | 10-2021-0027629 | 3/2021 |
| WO | WO2016-136382 | 9/2016 |

* cited by examiner

| DIVISION | COMPRESSOR | HEAT RADIATION AMOUNT | WORK OF COMPRESSOR | Recycle |
|---|---|---|---|---|
| COMPARISON | RPM | kW | kW | % |
| Recycle case | 5000 | 2.268 | 1.68 | 1 |
| Base case | 8700 | 2.268 | 1.65 | 0 |

THERMAL MANAGEMENT SYSTEM FOR VEHICLE

CROSS REFERENCE TO RELATED APPLICATION

The present application is a divisional of U.S. patent application Ser. No. 17/842,604, filed Jun. 16, 2022, which claims priority to Korean Patent Application No. 10-2021-0176835, filed Dec. 10, 2021, the entire contents of which is incorporated herein for all purposes by this reference.

BACKGROUND OF THE PRESENT DISCLOSURE

Field of the Present Disclosure

The present disclosure relates to a thermal management system for a vehicle. More particularly, the present disclosure relates to a thermal management technology for a vehicle using a recirculation heat pump for increasing the amount of heat for heating under low-temperature conditions.

Description of Related Art

Recently, due to environmental issues of an internal combustion engine vehicle, the dissemination of an eco-friendly vehicle such as an electric vehicle is increasing. In a conventional internal combustion engine vehicle, additional energy for heating is not required because interior of a vehicle may be heated by use of waste heat of an engine. However, in an electric vehicle and the like, because an electric vehicle and the like are not provided with an engine, there is no heat source, so that additional energy is required to perform heating. Therefore, there has been a problem that fuel efficiency of the electric vehicle is decreased. Furthermore, it is true that the present problem causes inconveniences such as a need for frequent charging and the like because a drivable distance of the electric vehicle is reduced.

Meanwhile, due to electric operation of a vehicle, not only thermal management needs of an interior of the vehicle but also thermal management needs of electric components such as a high-voltage battery, a motor, and the like are newly added. That is, in the electric vehicle and the like, demands for air conditioning of an internal space, a battery, and the electric components are different from each other, so that a technology capable of independently managing and efficiently cooperating with the internal space, the battery, and the electric components so that energy is maximally conserved is required. Therefore, to improve thermal efficiency by integrating thermal management of the entire vehicle while independently performing thermal management for each configuration, an integrated thermal management concept has been proposed.

To perform the integrated thermal management of the vehicle, it is necessary to integrate and modularize coolant lines and components that are complexly structured. Therefore, a concept of modularization in which multiple components are modularized and are easy to manufacture and are compact in terms of packaging is required.

FIG. 1 and FIG. 2 are a circuit diagram and a P-h diagram illustrating a heat pump cycle according to a conventional technology, respectively.

Referring to FIG. 1 and FIG. 2, in the heat pump cycle according to the conventional technology, the amount of heat of a refrigerant which is compressed at high-temperature/high-pressure in a compressor 11 is transferred to an internal condenser 12 and a water-cooled condenser 13.

Refrigerant lines 10 and 20 of the heat pump cycle are connected so that the refrigerant compressed at high-temperature/high-pressure in the compressor 11 is branched to the internal condenser 12 and the water-cooled condenser 13 and radiates heat and is circulated to the compressor 11 again after the refrigerant absorbs heat while passing through an expansion valve 14 and a chiller 15. Here, the chiller 15 is an apparatus configured to absorb heat from a coolant in a coolant line cooling a battery or an electric component.

In the heat pump cycle according to the conventional technology, the amount of heat radiated at the internal condenser 12 (the heat radiation amount of the internal condenser 12) is equal to the amount of work of the compressor 11 (the work of the compressor 11), so that the Coefficient Of Performance (COP) of the heat pump is limited to one.

Therefore, in the heat pump cycle according to the conventional technology, the COP does not exceed one. Furthermore, to supply the additional amount of heat to the internal condenser 12, an additional thermal transferring medium such as the coolant was required, and at the same time, the Engine revolutions per minute (RPM) of the compressor 11 is required to be increased, so that there is a limitation that noise is largely generated. Furthermore, there is a problem that the heat pump cycle according to the conventional technology takes time to increase the amount of heat for heating of the internal condenser 12.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a thermal management system technology for a vehicle using a recirculation heat pump that recirculates a refrigerant discharged from a compressor to the compressor again, additionally supplying the amount of heat to the refrigerant discharged from the compressor.

In various aspects of the present disclosure, there is provided a thermal management system for a vehicle, the thermal management system including: a base circuit in which a compressor, a condenser, an expansion valve, and an evaporator are provided in order, wherein a refrigerant is circulated in the base circuit; a recirculation circuit branched from a discharge portion of the compressor in the base circuit and joined to the compressor or an inlet portion of the compressor so that the refrigerant discharged from the compressor is recirculated to an inlet of the compressor; and an adjusting valve positioned at the discharge portion where the recirculation circuit is branched from the base circuit or positioned at the inlet portion where the recirculation circuit is joined to the base circuit, the adjusting valve configured to adjust a flow rate of the refrigerant that flows to the recirculation circuit.

The thermal management system may further include an ejector positioned at the inlet portion where the recirculation circuit is joined to the base circuit, the ejector configured to perform suction of the refrigerant in the base circuit by use of flowing of the refrigerant in the recirculation circuit.

The compressor may be a two-stage compressor in which the refrigerant in a gaseous state is additionally injected into an intermediate portion of compressor and the refrigerant in the gaseous state is mixed, and the recirculation circuit may be connected to the compressor so that the refrigerant is additionally injected into the intermediate portion of the compressor.

The base circuit may have a flash tank which is provided between the condenser and the evaporator, and the thermal management system may further include a flash circuit branched from the flash tank of the base circuit and joined to the recirculation circuit so that the refrigerant in a gaseous state separated in the flash tank flows to the recirculation circuit.

The expansion valve may include a first expansion valve positioned at an upstream point of the flash tank and a second expansion valve positioned at a downstream point of the flash tank.

The thermal management system may further include a shutoff valve provided in the flash circuit between the flash tank and the recirculation circuit, the shutoff valve configured to adjust the flow rate of the refrigerant that flows to the flash circuit.

The base circuit may have a heat-exchanger which is provided between the condenser and the evaporator, and the thermal management system may further include a heat-exchanging circuit branched from an upstream point of the heat-exchanger in the base circuit and joined to the recirculation circuit via the heat-exchanger.

The expansion valve may include a third expansion valve positioned at a downstream point of the heat-exchanger of the base circuit and a fourth expansion valve positioned at an upstream point of the heat-exchanger in the heat-exchanging circuit.

According to the thermal management system technology for the vehicle, because Coefficient Of Performance (COP) of a heat pump cycle under low-temperature conditions is increased, there is an effect that the amount of heat for heating is rapidly supplied.

Furthermore, because the amount of heat for heating is increased without increasing the RPM of the compressor, there is an effect that marketability is improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
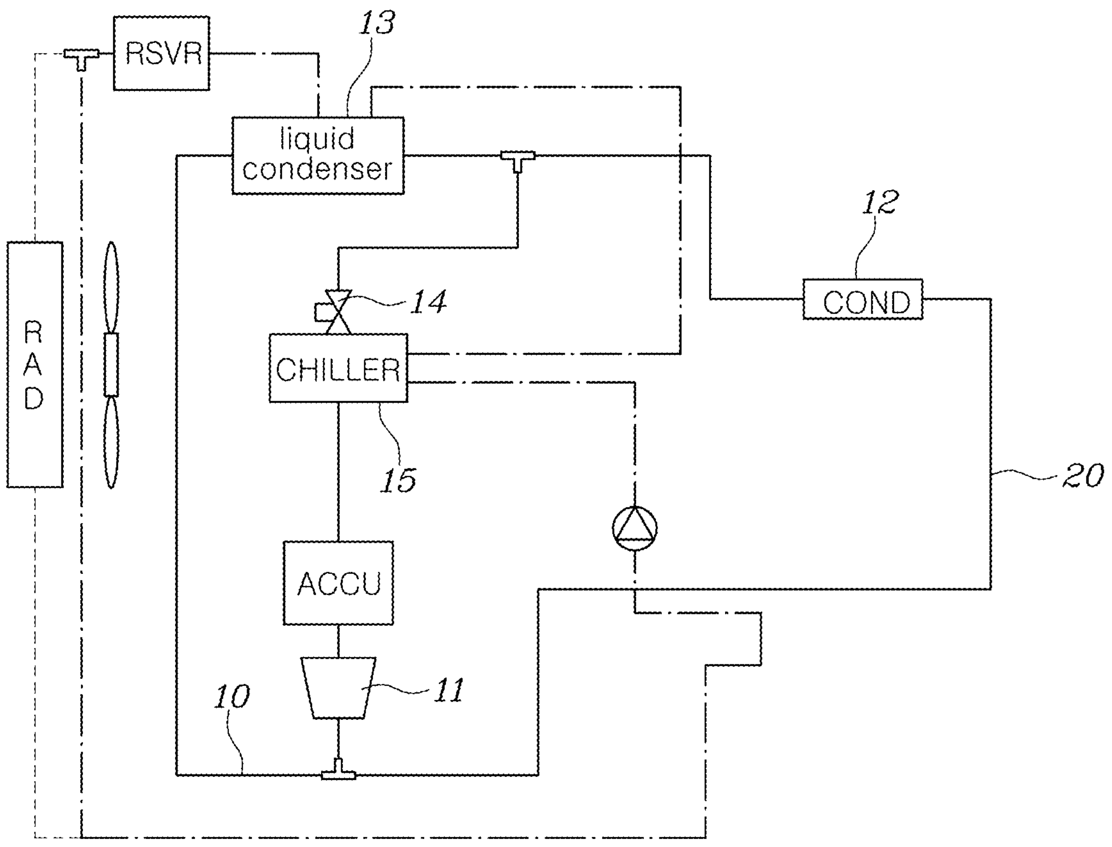
FIG. 1 (Prior Art)
FIG. 1 and FIG. 2 are a circuit diagram and a P-h diagram illustrating a heat pump cycle according to a conventional technology, respectively.
Figure 2:
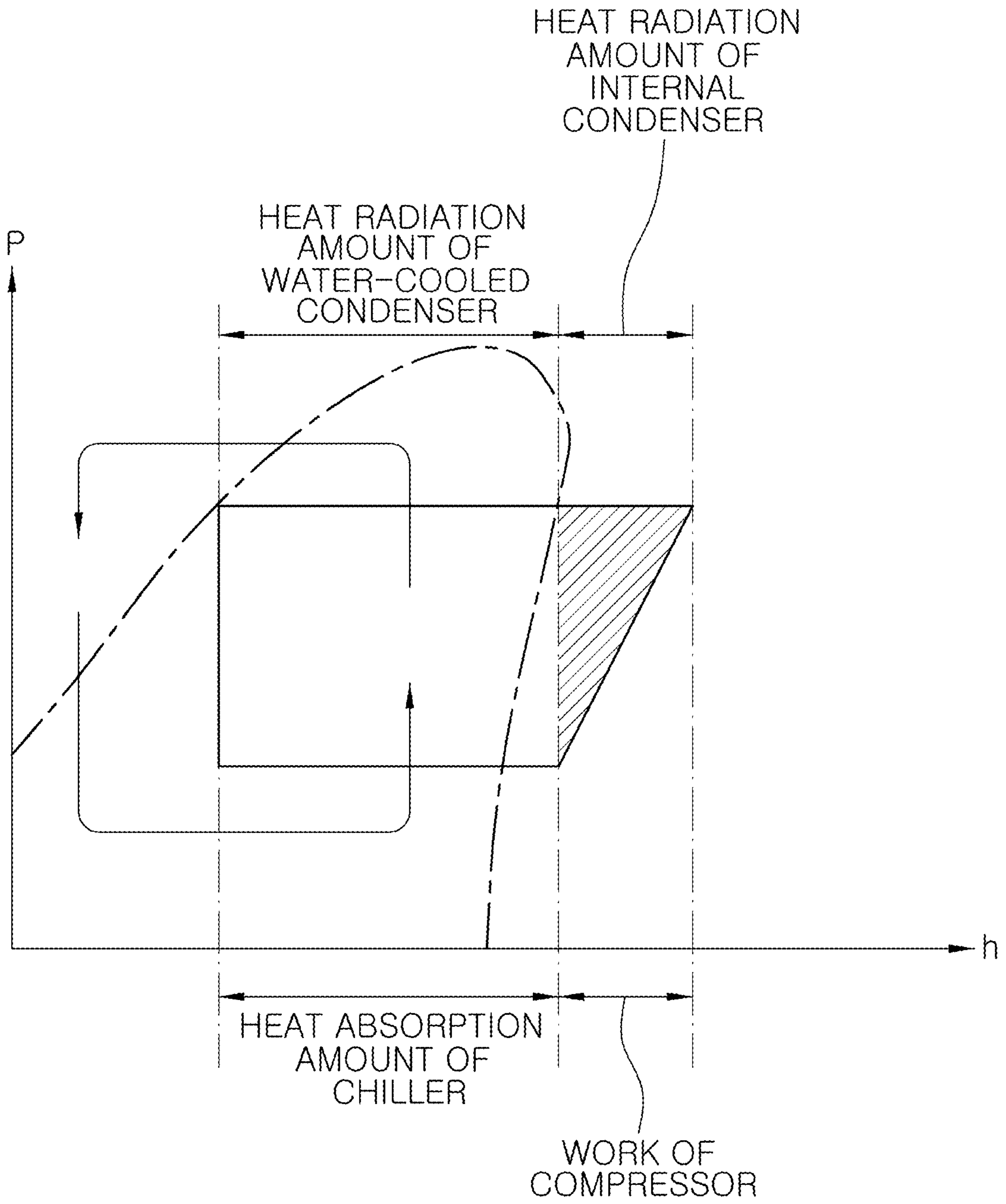
FIG. 2 (Prior Art)

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of the embodiments of the present disclosure disclosed in the present specification are exemplified only for the purpose of describing the embodiments according to an exemplary embodiment of the present disclosure, and the embodiments according to an exemplary embodiment of the present disclosure may be implemented in various forms, and should not be construed as being limited to the embodiments described in the present specification.

Since the embodiments according to an exemplary embodiment of the present disclosure can be modified in various ways and have various forms, specific embodiments are illustrated in the drawings and will be described in detail in the present specification. However, this is not intended to limit the embodiments according to the concept of the present disclosure to a specific form of disclosure, and it should be understood that all changes, equivalents, and substitutes included in the spirit and scope of the present disclosure are included.

Terms such as first and/or second may be used to describe various components, but the components should not be limited by the terms. The above terms are only for the purpose of distinguishing one component from other components, for example, without departing from the scope of the rights according to the concept of the present disclosure, the first component may be referred to as the second component, and similarly the second component may also be referred to as a first component.

When a component is referred to as being "connected" or "contacted" to another component, it should be understood that it may be directly connected or contacted to the other component, but other components may exist in the middle. On the other hand, when a component is referred to as being "directly connected" or "directly contacted" to another component, it should be understood that there is no other component in the middle. Other expressions describing the relationship between components, such as "between" and "just between" or "adjacent to" and "directly adjacent to" should be interpreted as well.

The terms used in the present specification are only used to describe specific embodiments, and are not intended to limit the present disclosure. Singular expressions include plural expressions unless the context clearly indicates otherwise. In the present specification, terms such as "comprise" or "have" are intended to designate the presence of a set feature, number, step, action, component, part, or combination thereof, but it should be understood that the presence or additional possibilities of one or more other features, numbers, steps, actions, components, parts, or combinations thereof are not preliminarily excluded.

Unless otherwise defined, all terms used herein, including technical or scientific terms, have the same meaning as commonly understood by one of ordinary skill in the art to which an exemplary embodiment of the present disclosure belongs. Terms such as those defined in a commonly used dictionary should be interpreted as having a meaning consistent with the meaning of the related technology, and should not be interpreted as an ideal or excessively formal meaning unless explicitly defined in the present specification.

Hereinafter, the present disclosure will be described in detail by describing an exemplary embodiment of the present disclosure with reference to the accompanying drawings. The same reference numerals shown in each drawing indicate the same members.

Figure 3:
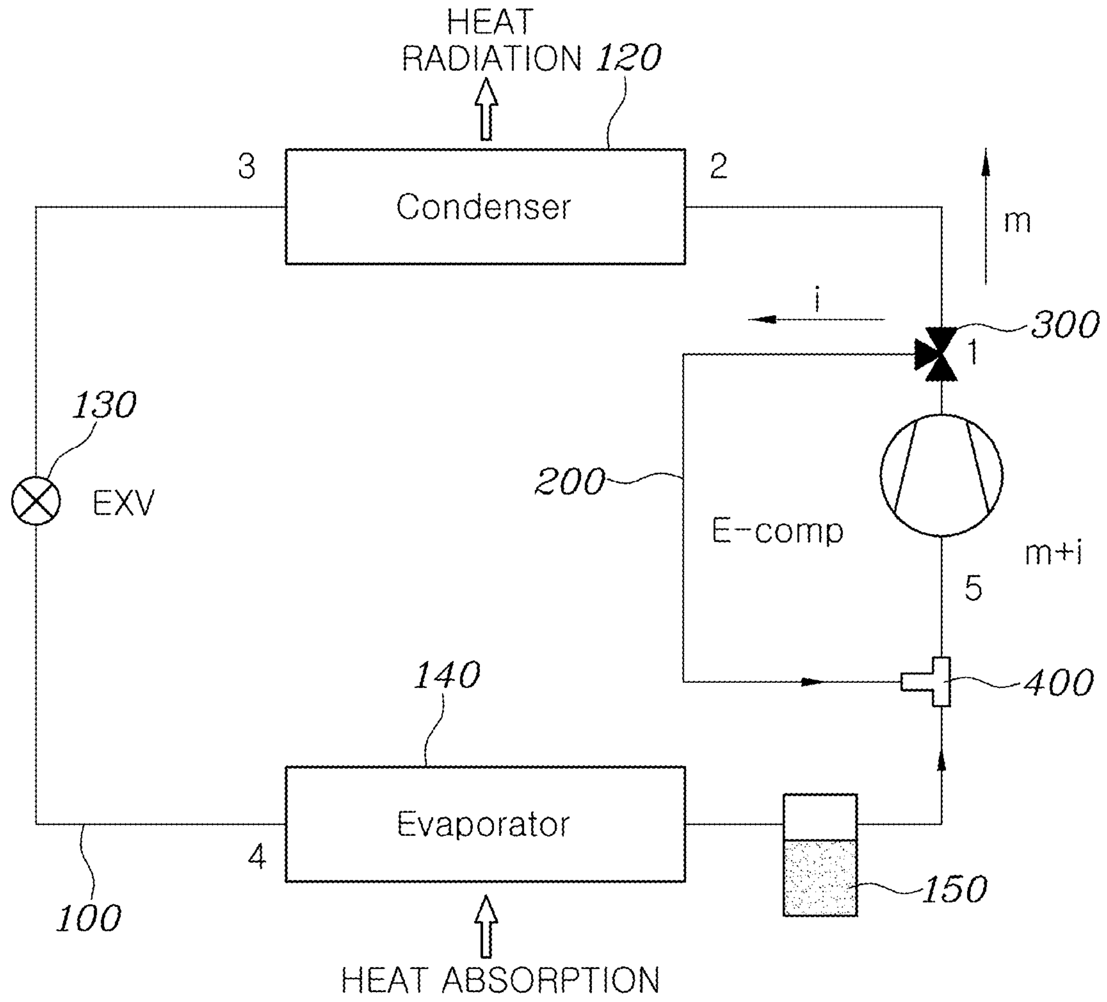
FIG. 3 and FIG. 4 are a circuit diagram and a P-h diagram illustrating a thermal management system for a vehicle according to various exemplary embodiments of the present disclosure, respectively.
Figure 4:
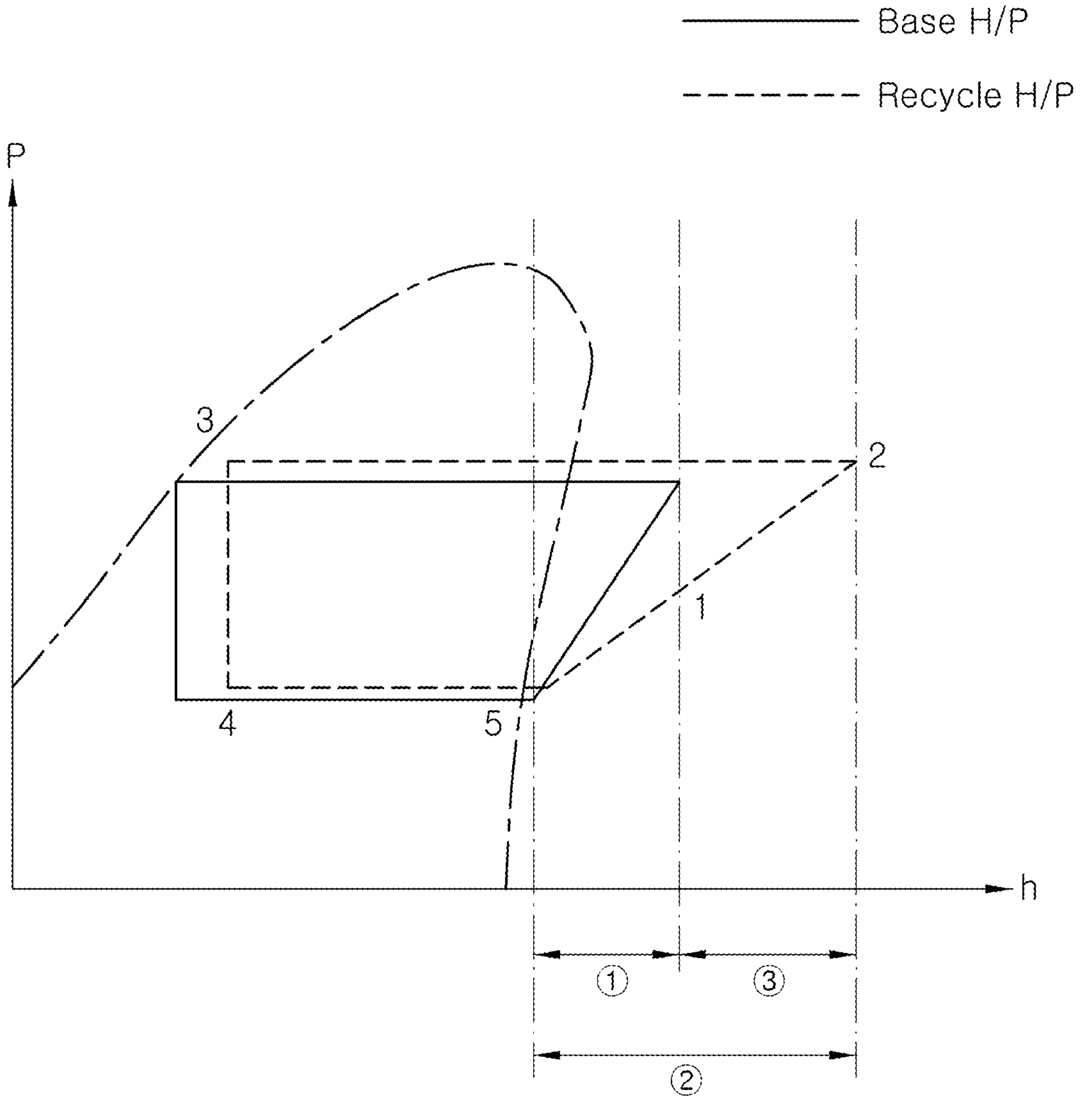

FIG. 3 and FIG. 4 are a circuit diagram and a P-h diagram illustrating a thermal management system for a vehicle according to various exemplary embodiments of the present disclosure, respectively.

Referring to FIG. 3 and FIG. 4, the thermal management system for the vehicle according to various exemplary embodiments of the present disclosure includes: a base circuit 100 in which a compressor 110, a condenser 120, an expansion valve 130, and an evaporator 140 are provided in order and in which a refrigerant is circulated; a recirculation circuit 200 branched from a discharge region of the compressor 110 in the base circuit 100 and joined to an inlet region of the compressor 110 so that the refrigerant discharged from the compressor 110 is recirculated to an inlet of the compressor 110; and an adjusting valve 300 positioned at a region where the recirculation circuit 200 is branched from the base circuit 100 or at a region where the recirculation circuit 200 is joined to the base circuit 100, the adjusting valve 300 being configured to adjust a flow rate of the refrigerant that flows into the recirculation circuit 200.

Furthermore, a controller configured to control driving of the adjusting valve 300, driving of the compressor 110, and the like may be further provided. In various exemplary embodiments of the present disclosure, the controller may be realized by a non-volatile memory configured to store an algorithm for controlling the operation of various elements of a vehicle or data on software commands for executing the algorithm and a processor configured to perform an operation, which will be described below, using the data stored in the memory. Here, the memory and the processor may be realized as individual chips. Alternatively, the memory and the processor may be realized as a single integrated chip. The processor may include one or more processors.

The base circuit 100 is a refrigerant circuit in which the refrigerant is circulated. The base circuit 100 may be a heat pump cycle (refrigeration cycle) in which the compressor 110, the condenser 120, the expansion valve 130, and the evaporator 140 are provided in order. Furthermore, a gas-liquid separator 150 may be further provided between the evaporator 140 and the compressor 110, and the refrigerant in a gaseous state may be supplied to the compressor 110.

In the heat pump cycle, the refrigerant at high-temperature/high-pressure compressed in the compressor 110 radiates heat from at the condenser 120, and is circulated to the compressor 110 again after the high-temperature/high-pressure refrigerant absorbs heat by passing through the expansion valve 130 and the evaporator 140 in order. Accordingly, the heat pump cycle in which the refrigerant absorbs heat by passing through the expansion valve 130 and the evaporator 140 that have a relatively low temperature and the refrigerant radiates heat to the condenser 120 that has a relatively high temperature.

Here, the condenser 120 may be an external condenser 120 exposed outside, or may be an internal condenser 120 exposed to an air conditioning flow path for heating interior of the vehicle.

The recirculation circuit 200 may be a refrigerant flow path branched from and joined to the base circuit 100. In the base circuit 100, the recirculation circuit 200 may be branched from the discharge region of the compressor 110, and may be connected to the base circuit 100 so that the recirculation circuit 200 is joined to the inlet region of the compressor 110. Accordingly, the recirculation circuit 200 may recirculate the refrigerant discharged from the compressor 110 to the inlet of the compressor 110.

Accordingly, a portion of the refrigerant primarily compressed and discharged from the compressor 110 is joined to the inlet region of the compressor 110 again via the base circuit 100, and is re-compressed in the compressor 110, so that the refrigerant compressed at a relatively higher pressure and temperature may be introduced into the condenser 120. Therefore, comparing to a heat pump cycle according to a conventional technology (Base H/P), the heat pump cycle according to an exemplary embodiment of the present disclosure has a partially reduced cooling capacity, but at least one of Coefficient Of Performance (COP) is realized in the heat pump cycle according to an exemplary embodiment of the present disclosure, so that there is an effect that the amount of heat for heating supplied to the condenser 120 is increased.

In an exemplary embodiment of the present disclosure, the adjusting valve 300 configured to adjust the flow rate of the refrigerant that flows through the recirculation circuit 200 may be positioned at a region where the recirculation circuit 200 is branched from the base circuit 100, or may be a three-way valve positioned at a region where the recirculation circuit 200 is joined to the base circuit 100.

In another exemplary embodiment of the present disclosure, the adjusting valve 300 may be a two-way valve positioned in the middle of the recirculation circuit 200.

As illustrated in the drawings, the adjusting valve 300 is the three-way valve positioned at the region where the recirculation circuit 200 is branched from the base circuit 100, and a three-way pipe may be provided at the region where the recirculation circuit 200 is joined to the base circuit 100.

Figure 5:
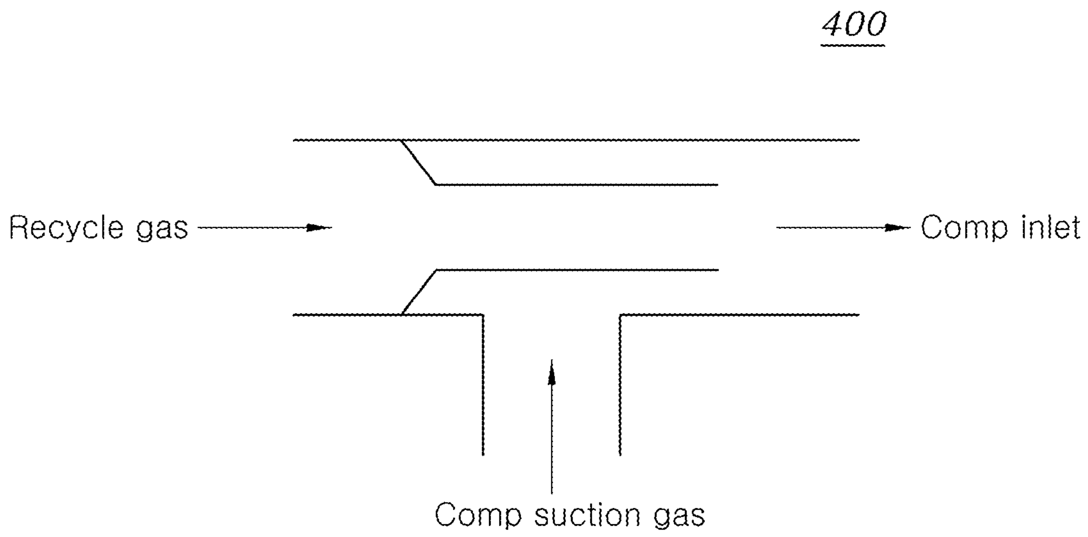
FIG. 5 is a view exemplarily illustrating an ejector of the thermal management system for the vehicle according to various exemplary embodiments of the present disclosure.

FIG. 5 is a view exemplarily illustrating an ejector 400 of the thermal management system for the vehicle according to various exemplary embodiments of the present disclosure.

Referring to FIG. 5, the ejector 400 which is positioned at the region where the recirculation circuit 200 is joined to the base circuit 100 and which is configured to perform suction of the refrigerant of the base circuit 100 by use of flowing of the refrigerant in the recirculation circuit 200 may be further included.

The high-pressure refrigerant (recycle gas) discharged from the compressor 110 of the base circuit 100 may be introduced into inside of a nozzle of the ejector 400, and the low-pressure refrigerant that has passed the condenser 120 may be introduced into an outside of the nozzle of the ejector 400. While the high-pressure refrigerant, which is introduced into the inside of the nozzle of the ejector 400, is passing through the nozzle of the ejector 400, the high-pressure refrigerant may perform suction of the refrigerant in the base circuit 100, the refrigerant having passed the condenser 120. The refrigerant in the recirculation circuit 200 and the refrigerant in the base circuit 100 may be mixed together while passing through the ejector 400, and may be introduced into the compressor 110 while being in a mixed state.

To improve the performance of the refrigeration cycle, the research of applying the ejector 400 or an injection has been actively conducted.

In a refrigeration cycle in which a conventional ejector 400 is applied, by a compression restoration function of the ejector 400 which is utilizing a Venturi effect, the refrigerant condensed in the condenser 120 flows to the gas-liquid separator 150, and the refrigerant in a liquid state is circulated via the expansion valve 130 and the evaporator 140. Accordingly, power consumption (work) of the compressor 110 is reduced, and there is an effect that the flow rate of the refrigerant is increased compared to that of an ordinary refrigeration cycle.

In a refrigeration cycle in which a gas injection is applied, the refrigerant flows to the evaporator 140 by a two-stage expansion process, and the middle-pressure gaseous refrigerant which is primarily expanded is injected into the compressor 110. Accordingly, the flow rate of the refrigerant that flows to the external condenser 120 or the internal condenser 120, to the compressor 110, and the like is increased, and there is an effect that power consumption of the compressor 110 is reduced since the compression effect is increased by a two-stage compression. The deterioration of the refrigeration cycle performance in cold regions and tropical regions may be solved.

In a flash tank 160 type, after entire of the refrigerant is expanded from a rear end portion of the external condenser 120 or the internal condenser 120, the refrigerant in the gaseous state and the refrigerant in the liquid state are separated and are flowed to the compressor 110 and a secondary expansion valve 130, respectively. Accordingly, by separating and secondarily expanding the refrigerant in the liquid state, a dryness of the refrigerant which is introduced into the evaporator 140 is reduced.

Furthermore, in a heat-exchanger 170 type, a portion of the refrigerant is separated from the rear end portion of the external condenser 120 or the internal condenser 120, and exchanges-heat with the middle-pressure refrigerant which is primarily expanded. Accordingly, the separated refrigerant is evaporated, and the dryness of the refrigerant which is also secondarily expanded and which is introduced into the evaporator 140 is reduced.

Figure 6:
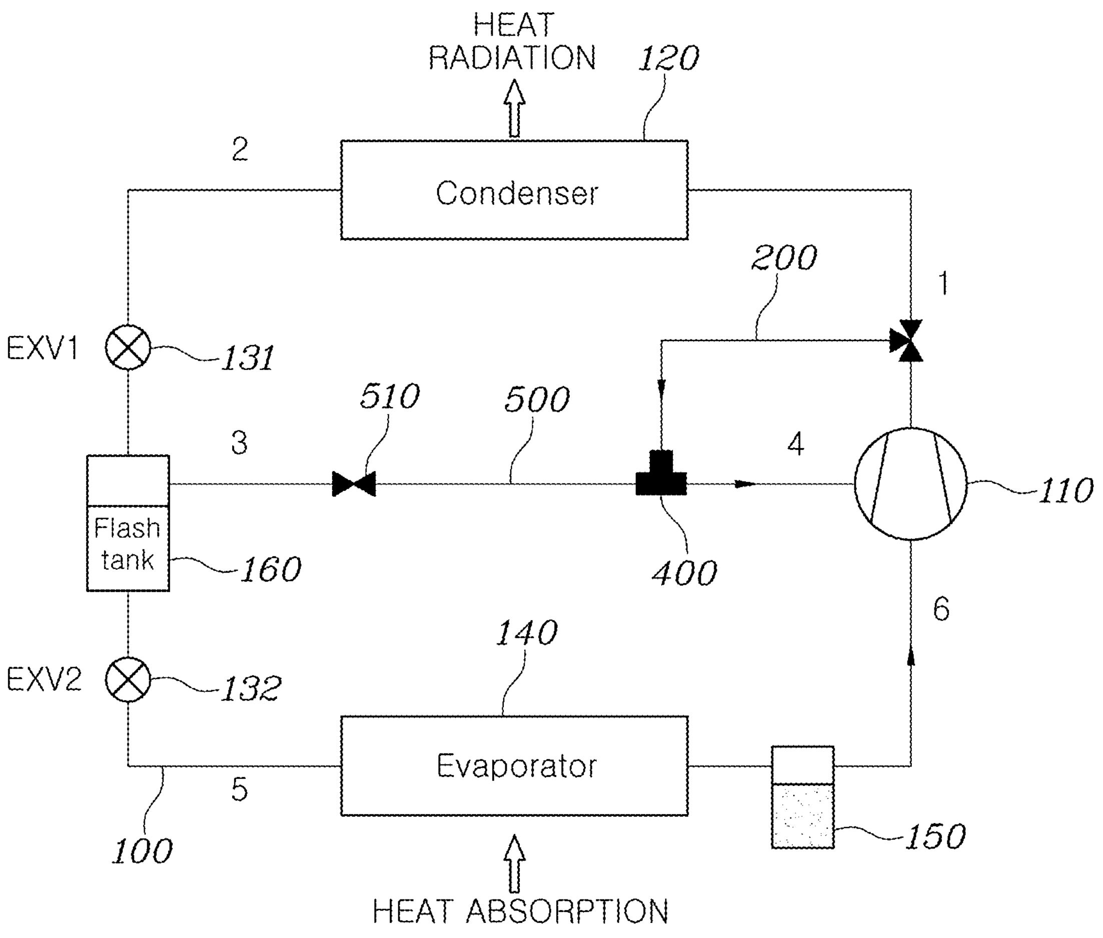
FIG. 6 and FIG. 7 are a circuit diagram and a P-h diagram illustrating the thermal management system for the vehicle according to various exemplary embodiments of the present disclosure, respectively.
Figure 7:
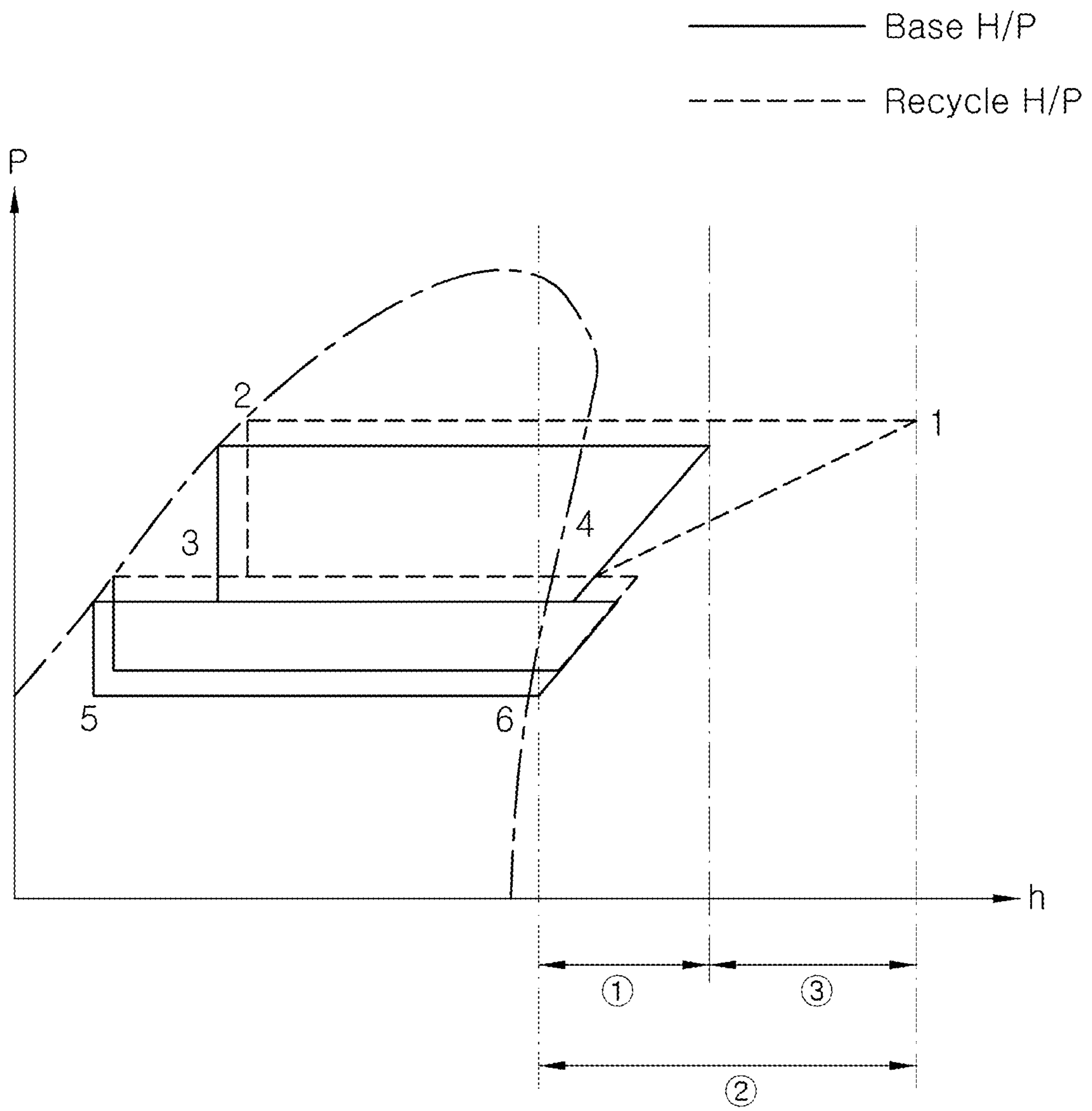

FIG. 6 and FIG. 7 are a circuit diagram and a P-h diagram illustrating the thermal management system for the vehicle according to various exemplary embodiments of the present disclosure, respectively.

Referring to FIG. 6 and FIG. 7, in the thermal management system for the vehicle according to various exemplary embodiments of the present disclosure, the flash tank 160 type gas injection heat pump cycle is applied.

In the thermal management system for the vehicle according to various exemplary embodiments of the present disclosure, the base circuit 100 has the flash tank 160 which is provided between the condenser 120 and the evaporator 140, and a flash circuit 500 branched from the flash tank 160 and joined to the recirculation circuit 200 so that the refrigerant in the gaseous state separated from the flash tank 160 flows into the recirculation circuit 200 may be further included.

The refrigerant that has passed through the condenser 120 of the base circuit 100 is introduced into the flash tank 160, and the introduced refrigerant may be separated into the gaseous state and the liquid state from an internal portion of the flash tank 160. The refrigerant in the gaseous state separated in the flash tank 160 may flow into the recirculation circuit 200 via the flash circuit 500.

A first end portion of the flash circuit 500 may be connected to an upper portion of the flash tank 160 so that the refrigerant in the gaseous state is introduced, and a second end portion of the flash circuit 500 may be connected to the recirculation circuit 200.

Here, the compressor 110 is a two-stage compressor 110 in which the refrigerant in the gaseous state is additionally injected into an intermediate region of compression and the refrigerant in the gaseous state is mixed, and the recirculation circuit 200 may be connected to the inlet region of the compressor 110 so that the refrigerant is additionally added to the intermediate region of compression.

That is, the compressor 110 may be the two-stage compressor 110 in which an injection port into which the middle-pressure gaseous refrigerant is injected is formed in the intermediate region of compression separately from an inlet port into which the refrigerant is introduced.

The expansion valve 130 may include a first expansion valve 131 positioned at an upstream point of the flash tank 160 and a second expansion valve 132 positioned at a downstream point of the flash tank 160.

The first expansion valve 131 may primarily expand the refrigerant in the upstream point of the flash tank 160, the refrigerant having passed through the condenser 120. Furthermore, the primarily expanded refrigerant may be separated into the gaseous state and the liquid state in the flash tank 160. The refrigerant in the liquid state may be secondarily expanded while passing through the second expansion valve 132 again.

Between the flash tank 160 of the flash circuit 500 and the recirculation circuit 200, a shutoff valve 510 configured to adjust the flow rate of the refrigerant that flows to the flash circuit 500 may be further included.

The shutoff valve 510 may be a two-way valve which is positioned in the middle portion of the flash circuit 500 and which is configured to adjust the flow rate of the refrigerant that flows to the flash circuit 500.

Figure 8:
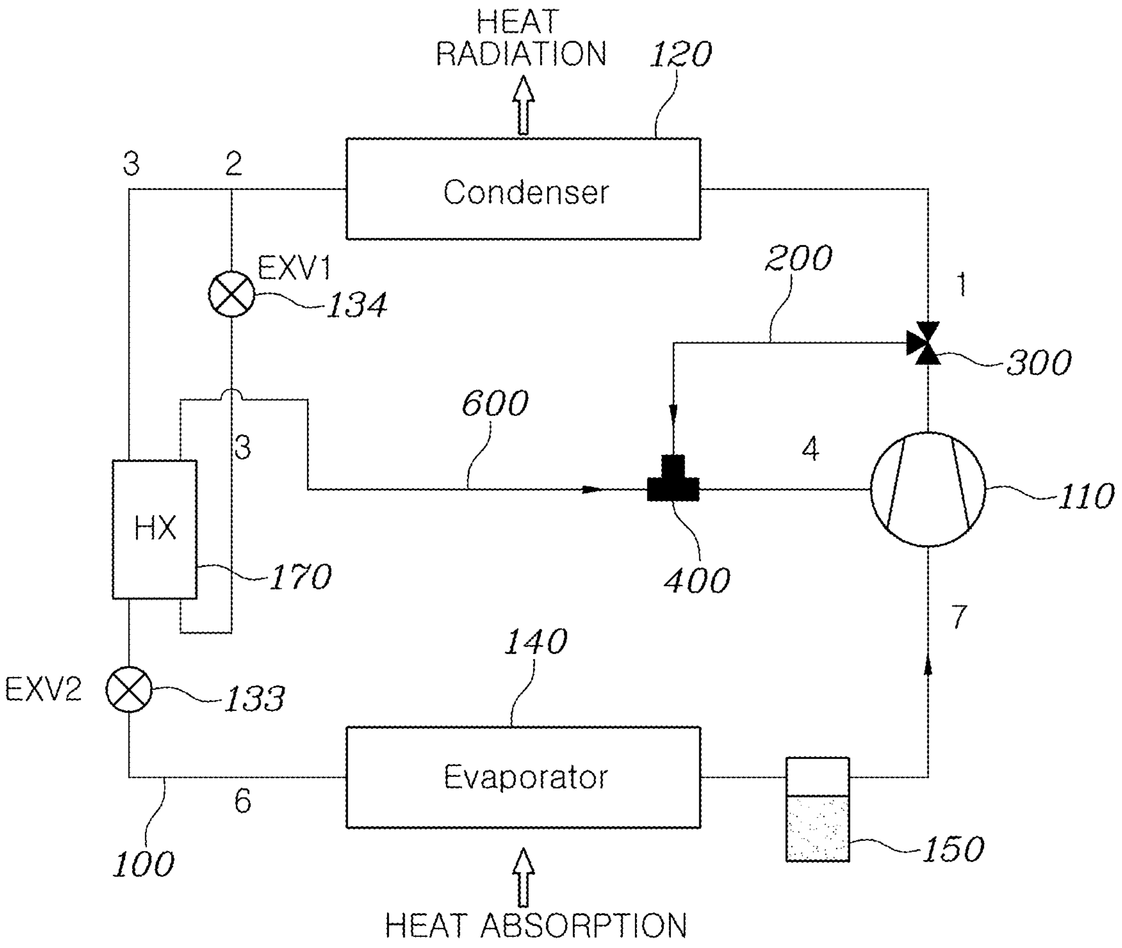
FIG. 8 and FIG. 9 are a circuit diagram and a P-h diagram illustrating the thermal management system for the vehicle according to various exemplary embodiments of the present disclosure, respectively.
Figure 9:
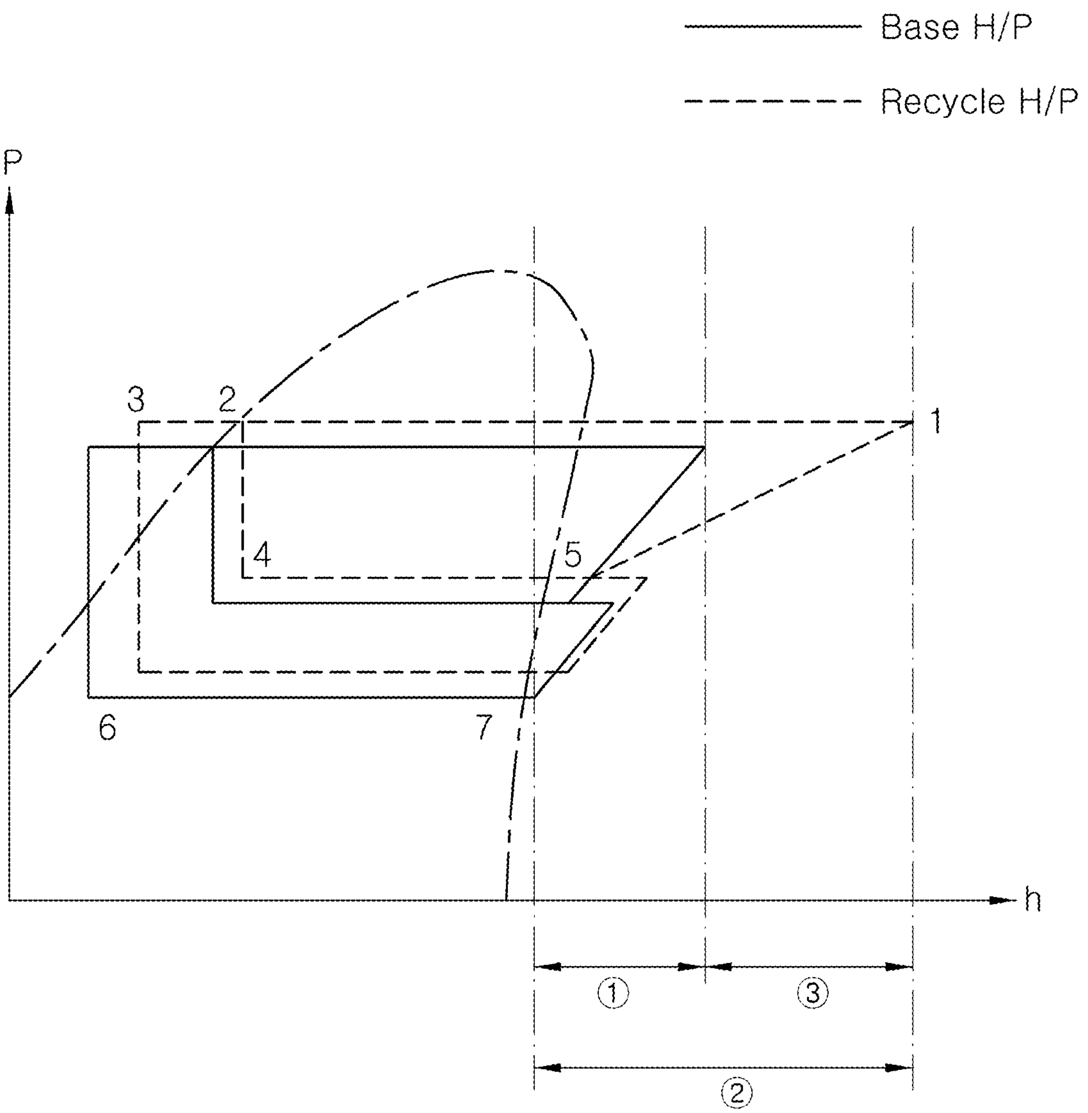

FIG. 8 and FIG. 9 are a circuit diagram and a P-h diagram illustrating the thermal management system for the vehicle according to various exemplary embodiments of the present disclosure, respectively.

Referring to FIG. 8 and FIG. 9, in the thermal management system for the vehicle according to various exemplary embodiments of the present disclosure, the heat-exchanger 170 type gas injection heat pump cycle is applied.

In the thermal management system for the vehicle according to various exemplary embodiments of the present disclosure, the base circuit 100 has the heat-exchanger 170 which is provided between the condenser 120 and the evaporator 140, and a heat-exchanging circuit 600 branched from an upstream point of the heat-exchanger 170 of the base circuit 100 and joined to the recirculation circuit 200 may be further included.

The heat-exchanger 170 may be an apparatus which is provided so that the base circuit 100 and the heat-exchanging circuit 600 can exchange heat with each other. The heat-exchanger 170 may be positioned between the condenser 120 and the evaporator 140 of the base circuit 100, and may be positioned between a region where the heat-exchanging circuit 600 is branched and a region where the heat-exchanging circuit 600 is joined.

The heat-exchanging circuit 600 may be a refrigerant circuit which is branched from the base circuit 100. The heat-exchanging circuit 600 may be branched from the upstream point of the heat-exchanger 170. A portion of the refrigerant that has passed through the condenser 120 of the base circuit 100 may flow to the recirculation circuit 200 via the heat-exchanger 170 while being flowed to the heat-exchanging circuit 600, and other portions of the refrigerant that has passed through the condenser 120 of the base circuit 100 may flow to the evaporator 140 via the heat-exchanger 170.

The expansion valve 130 may include a third expansion valve 133 positioned at a downstream point of the heat-exchanger 170 of the base circuit 100 and a fourth expansion valve 134 positioned at the upstream point of the heat-exchanger 170 of the heat-exchanging circuit 600.

Because the third expansion valve 133 of the base circuit 100 is positioned at the downstream point of the heat-exchanger 170 and the fourth expansion valve 134 of the heat-exchanging circuit 600 is positioned at the upstream point of the heat-exchanger 170, the refrigerant in the heat-exchanging circuit 600 may absorb heat from at the heat-exchanger 170 and the refrigerant in the base circuit 100 may radiate heat at the heat-exchanger 170.

Figures 10, 11:
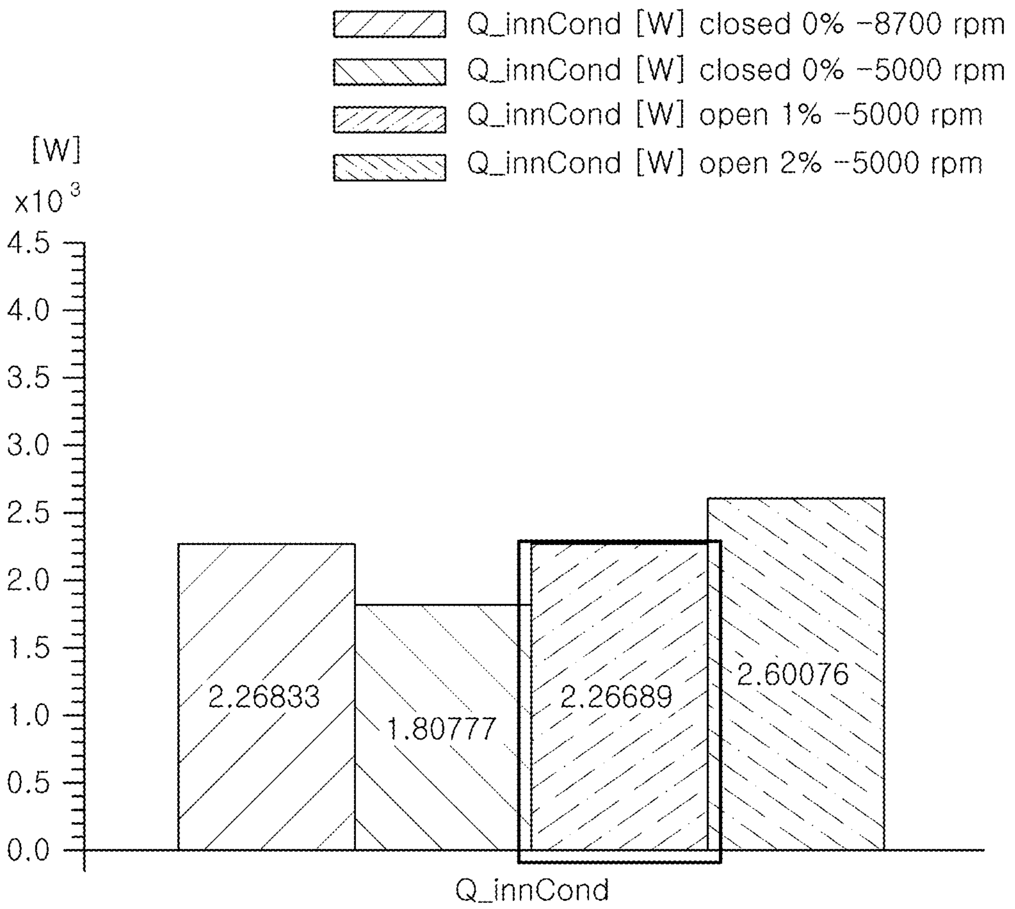
FIG. 10 is a table illustrating a comparison of an operation result in the thermal management system for the vehicle according to various exemplary embodiments of the present disclosure and an operation result in a conventional system.
FIG. 11 is a graph illustrating the amount of heat for heating in the thermal management system for the vehicle according to various exemplary embodiments of the present disclosure and the amount of heat for heating in the conventional system.

FIG. 10 is a table illustrating a comparison of an operation result in the thermal management system for the vehicle according to various exemplary embodiments of the present disclosure and an operation result in a conventional system, and FIG. 11 is a graph illustrating the amount of heat for heating in the thermal management system for the vehicle according to various exemplary embodiments of the present disclosure and the amount of heat for heating in the conventional system.

Referring to FIG. 10, and FIG. 11, according to an adjustment of an opening amount of the adjusting valve 300, the ratio of the flow rate of the refrigerant flowing into the recirculation circuit 200 to the flow rate of the refrigerant flowing into the base circuit 100 is compared with a condition of 0%, a condition of 1%, and a condition of 2%. Here, the condition of 0% in which the ratio of the flow rate of the refrigerant flowing into the recirculation circuit 200 to the flow rate of the refrigerant flowing into the base circuit 100 is a condition in which the refrigerant only flows to the base circuit 100 without the recirculation circuit 200 as in the conventional technology.

As illustrated in FIG. 11, in the condition of 0% (closed, conventional technology) in which the ratio of the flow rate of the refrigerant flowing into the recirculation circuit 200 to the flow rate of the refrigerant flowing into the base circuit 100, the compressor 110 is required to be operated in which the RPM of the compressor 110 increases to 8700 [rpm] for generating the amount of heat for heating (heat radiation amount) of the condenser 120 under the condition of 0% to be the same level of the amount of heat for heating of the condenser 120 in an exemplary embodiment of the present disclosure. However, in the condition of 1% in which the ratio of the flow rate of the refrigerant flowing into the recirculation circuit 200 is 1% according to an exemplary embodiment of the present disclosure, it may be sufficient that the compressor 110 is operated at 5000 [rpm]. That is, noise and vibration of the vehicle that are increased as the RPM of the compressor 110 increases may be prevented from increasing.

Furthermore, as illustrated in FIG. 11, when the compressor 110 is operated at 5000 [rpm], in the condition of 0% in which the ratio of the flow rate of the refrigerant flowing into the recirculation circuit 200 to the flow rate of the refrigerant flowing into the base circuit 100 is 0%, the amount of heat for heating of the condenser 120 is largely reduced compared to that of the condition of 1% in which the ratio of the flow rate of the refrigerant flowing into the recirculation circuit 200 to the flow rate of the refrigerant flowing into the base circuit 100 is 1%.

To secure the amount of heat for heating of the condenser 120 in the condition of 1% in which the ratio of the flow rate of the refrigerant flowing into the recirculation circuit 200 to the flow rate of the refrigerant flowing into the base circuit 100, the compressor 110 is required to be operated in which the RPM of the compressor increases to 8700 [rpm] when in the condition of 0% in which the ratio of the flow rate of the refrigerant flowing into the recirculation circuit 200 to the flow rate of the refrigerant flowing into the base circuit 100.

Furthermore, in the condition of 2% in which the ratio of the flow rate of the refrigerant flowing into the recirculation circuit 200 to the flow rate of the refrigerant flowing into the base circuit 100 is 2%, the amount of heat for heating of the condenser 120 may be more largely secured.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A thermal management system for a vehicle, the thermal management system comprising:

a base circuit in which a compressor, a condenser, an expansion valve, and an evaporator are provided in order, wherein a refrigerant is circulated in the base circuit;

a recirculation circuit branched from a discharge portion of the compressor in the base circuit and joined to the compressor or an inlet portion of the compressor so that the refrigerant discharged from the compressor is recirculated to an inlet of the compressor; and an adjusting valve positioned at the discharge portion where the recirculation circuit is branched from the base circuit or positioned at the inlet portion where the recirculation circuit is joined to the base circuit, the adjusting valve configured to adjust a flow rate of the refrigerant that flows to the recirculation circuit, an ejector positioned at the inlet portion where the recirculation circuit is joined to the base circuit, the ejector configured to perform suction of the refrigerant in the base circuit by use of flowing of the refrigerant in the recirculation circuit, wherein the base circuit has a flash tank which is provided between the condenser and the evaporator, and the thermal management system further includes a flash circuit branched from the flash tank of the base circuit and joined to the recirculation circuit so that the refrigerant in a gaseous state separated in the flash tank flows to the recirculation circuit, and wherein the thermal management system further includes a shutoff valve provided in the flash circuit between the flash tank and the ejector, the shutoff valve configured to adjust the flow rate of the refrigerant that flows to the flash circuit.

2. The thermal management system of claim 1, wherein the expansion valve includes a first expansion valve positioned at an upstream point of the flash tank and a second expansion valve positioned at a downstream point of the flash tank.

3. The thermal management system of claim 1, wherein a gas-liquid separator is provided between the evaporator and the compressor so that the refrigerant in the gaseous state is supplied to the compressor.

* * * * *